Aug. 10, 1954   R. A. FREEMAN ET AL   2,685,948
SLIDING DOG CLUTCH
Filed March 1, 1952   2 Sheets-Sheet 1
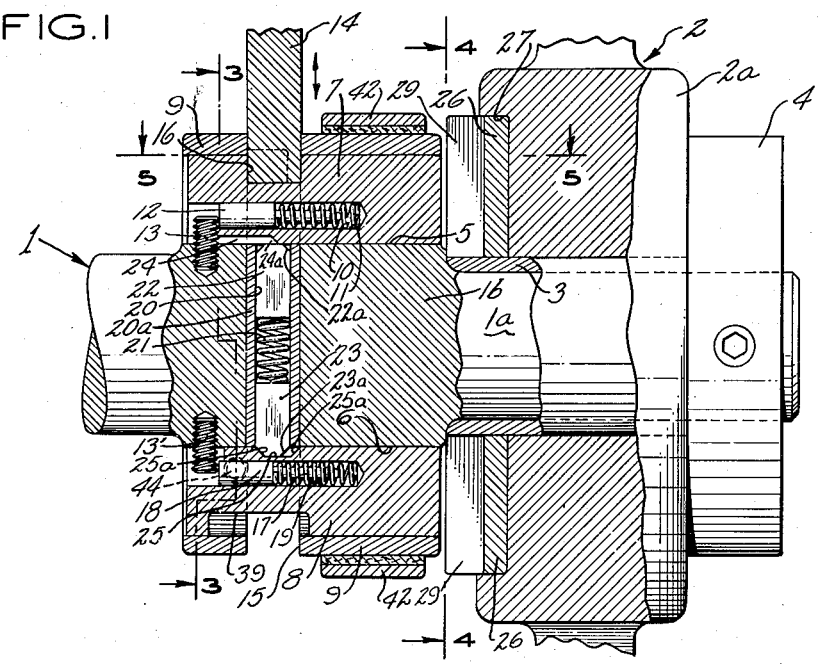
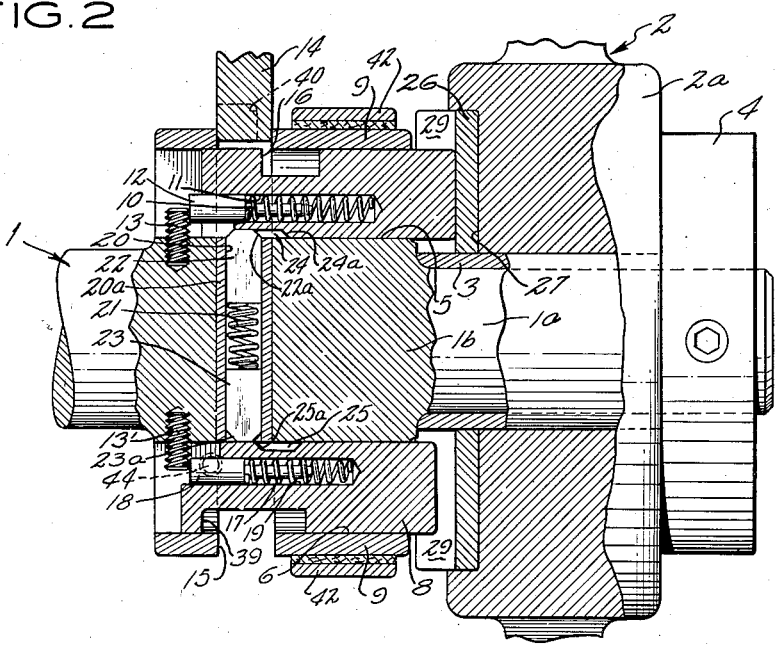
INVENTORS
RAYMOND A. FREEMAN
GEORGE H. GOUSE
BY Parham + Bates
ATTORNEYS Aug. 10, 1954     R. A. FREEMAN ET AL     2,685,948
SLIDING DOG CLUTCH
Filed March 1, 1952     2 Sheets-Sheet 2
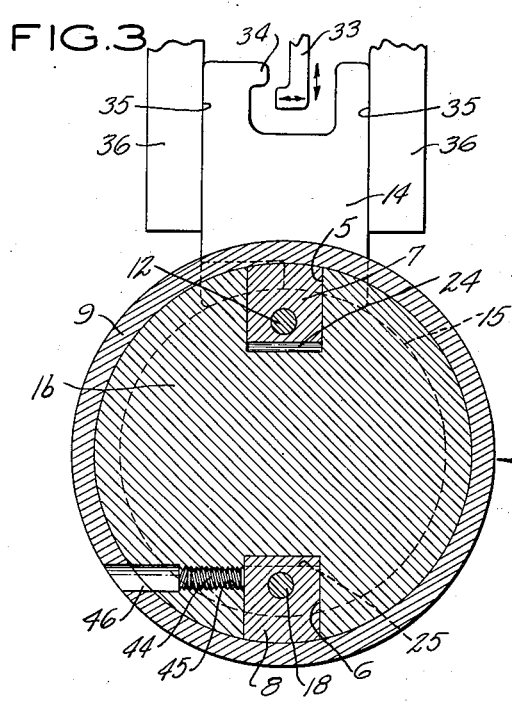
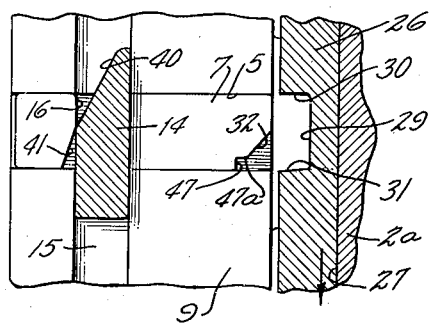
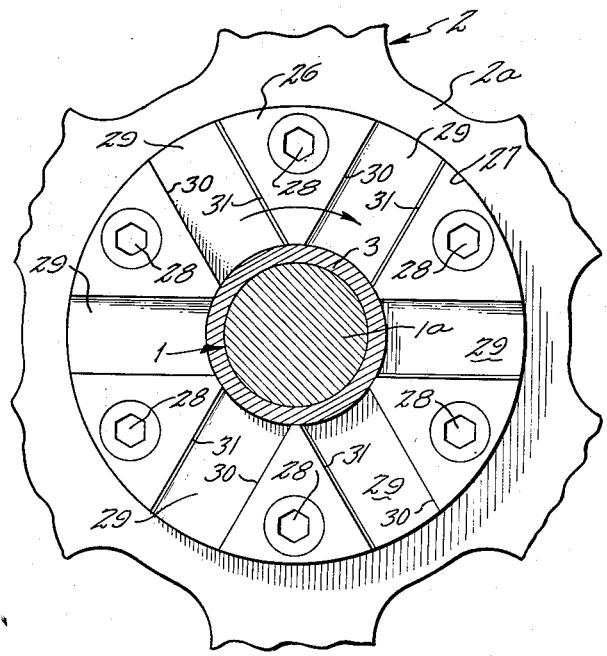
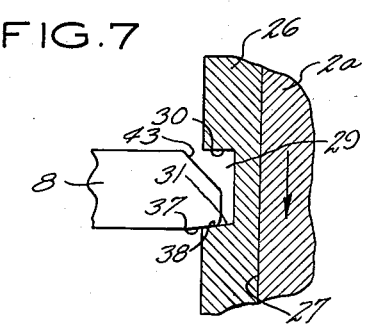
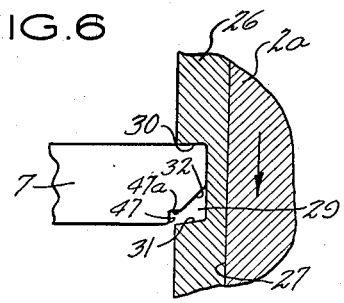
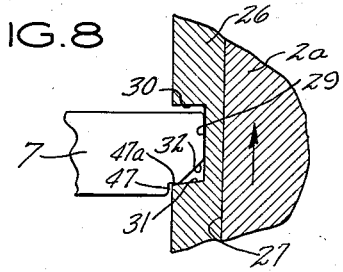
INVENTORS
RAYMOND A. FREEMAN
GEORGE H. GOUSE
BY *Parham & Bates*
ATTORNEYS Patented Aug. 10, 1954

2,685,948

UNITED STATES PATENT OFFICE 2,685,948

SLIDING DOG CLUTCH

Raymond A. Freeman and George H. Gouse, Hudson, N. Y., assignors to Emhart Manufacturing Company, Hartford, Conn., a corporation of Delaware Application March 1, 1952, Serial No. 274,444

6 Claims. (Cl. 192—25)

This invention relates to improvements in sliding dog clutches. While not restricted thereto, the type of sliding dog clutch to which the invention is applicable is that which is particularly adapted for use in a press, such as a power punch press.

A well-known sliding dog clutch of the prior art consists of a single sliding dog carried by a press shaft for co-action with a driving jaw on the hub of a driven fly wheel that turns freely on the shaft when the clutch is disengaged and drives the shaft when the sliding dog is engaged by the driving jaw of the fly wheel. In this construction, spring means tends to slide the dog along the shaft from a retracted, disengaged position to a projected, engaged position and a switch mechanism is employed to retract the dog from its engaged position.

A shortcoming of the single sliding dog clutch arrangement just described is that backlash or lost motion between the shaft and the fly wheel allows the press to operate with a "snap over" or rebound at the bottom of its stroke on heavy bottoming jobs, against heavy pressure pads in the press tools or against air or spring cushions. There is the further shortcoming that the press slide, carrying a punch or other tool, may "drop" or run ahead of its drive on the down-stroke, particularly in the operation of a press in which the slide has a long stroke and the punch or other tool is large and heavy.

These shortcomings of the single sliding dog clutch arrangement have been obviated by the provision of a second sliding dog, termed a "backing" dog, also carried by the press shaft and arranged to be slid automatically from a retracted, disengaged position to a projected position in engagement with a backing jaw on the hub of the fly wheel whenever the first or driving dog has moved to a projected position and is engaged by the driving jaw of the fly wheel. This will eliminate backlash or lost motion between the press shaft and the fly wheel together with the undesirable consequences thereof in the operation of the press.

This solution of the problem of the backlash or lost motion between the press shaft and fly wheel has, however, presented a further problem. It is desirable, in setting dies, to have some backlash so that a "hammer blow" effect can be applied to the shaft when the fly wheel is turned by hand. It is desirable to be able to back the shaft by turning the fly wheel reversely by hand either as a preliminary step in the operation of applying the "hammer blow" effect to the shaft in setting dies or for any other useful purpose. The double dog clutch construction provided prior to the present invention lacks both of these capabilities.

An object of the invention is to obviate or cure the shortcomings as above described of double sliding dog clutches of the character described while at the same time retaining all advantageous features thereof.

The manner in which such shortcomings are overcome and further objects and advantages of the invention will be understood from the following description of a practical embodiment of the invention as shown in the accompanying drawings, in which:

Fig. 1 is a view, mainly sectional, showing the improved double sliding dog clutch arrangement of the invention operatively associated with a press shaft and the hub of a press fly wheel, only fragmentary portions of the shaft and fly wheel being shown, the view showing the clutch arrangement in declutching or disengaged position with the sliding dogs thereof retracted;

Fig. 2 is a view similar to Fig. 1 but showing the sliding dogs of the clutch arrangement in projected or engaged positions in relation to the fly wheel hub;

Fig. 3 is a section substantially along the line 3—3 of Fig. 1;

Fig. 4 is a section substantially along the line 4—4 of Fig. 1;

Fig. 5 is a partial section substantially along the line 5—5 of Fig. 1;

Fig. 6 is a fragmentary sectional view showing the cooperative parts of the driving dog and the fly wheel hub when the dog is in its projected or engaged position;

Fig. 7 is a similar view showing the co-action of the backing dog with a backing jaw of the fly wheel hub; and Fig. 8 is a similar view showing the manner in which a backing jaw of the fly wheel hub co-acts with the driving dog in accordance with the present invention to back the shaft when the fly wheel is being turned by hand.

In the drawings, Figs. 1 and 2, a press shaft, generally designated 1, has an end portion 1a on which is mounted the hub 2a of a fly wheel, generally designated 2. As shown, a bushing 3 of bronze or other suitable material is provided in the fly wheel hub around the journal portion 1a of the press shaft and bears at one end against a diametrically enlarged portion 1b of the press shaft. The shaft is supported by means (not shown) for rotation about its axis. A large diameter fly wheel cap 4 secured on the shaft at the opposite side of the fly wheel from the enlarged portion 1b of the shaft retains the fly wheel on the shaft so that the fly wheel may turn freely on the shaft when declutched therefrom.

The enlarged portion 1b of the shaft serves as an integral block for the sliding dogs of the clutch mechanism and for a brake for the shaft as hereinafter will be made clear. Diametrically opposite guideways 5 and 6 extend longitudinally through enlarged portion 1b of the shaft and respectively accommodate a sliding driving dog 7 and a sliding backing dog 8. These longitudinal guideways may be provided in any suitable known way. In the example shown, an outer peripheral layer, indicated at 9, has been formed as a separate ring and shrunk or otherwise fixed in place on the encircled main portion of enlarged part 1b of the shaft after sliding dog guideways 5 and 6 have been milled therein. Of course, this peripheral layer 9 of the diametrically enlarged part 1b of the shaft might be integral with the remainder of the shaft.

The driving dog 7 is urged continuously by a compressed coil spring 10 disposed in a suitably formed elongate pocket or partial bore 11 in the dog from a retracted position as shown in Fig. 1 toward a position at which it will project from the right hand end of guideway 5, as shown in Fig. 2. The arrangement is such that one end of the coil spring 10 bears against the bottom of the pocket 11 while the opposite end of the spring reacts against a slidable pressure element in the form of a thrust pin 12 which at its outer end bears against a stop screw 13 that is carried by the shaft so as partially to block the outer or left hand end of pocket 11 as viewed in Fig. 1. The driving dog 7 is retained in Fig. 1 in its retracted or disengaged position in its guideway 5 by a switch plate 14 projecting into a peripheral slot 15 in the enlarged portion 1b of the shaft and engaging a transverse slot 16 in the outer side of the driving dog.

The backing dog 8 is urged continuously along its guideway 6 from its retracted position as shown in Fig. 1 toward a projected position as shown in Fig. 2. This results from the action of a compressed coil spring 17, similar to the spring 10, reacting against a pressure element 18 which is kept back against a stop screw 13' which partially blocks the outer end of a longitudinally extending pocket or partial bore 19 in dog 8 in which the element 18 and coil spring 17 are disposed.

The backing dog 8 is retained in its retracted position as shown in Fig. 1 when the driving dog 7 is retracted as shown in the same view. This is by reason of the action of an interlocking floating spring detent in a bore 20 that extends diametrically through the intervening portion of the shaft between the inner side of driving dog guideway 5 and the inner side of backing dog guideway 6. This floating detent is longitudinally expansible and compressible. It comprises an intermediate coil spring section 21 and a pair of solid plunger type end sections 22 and 23 respectively. The driving dog 7 is provided with a longitudinal slot or shallow recess 24 in its inner side next to the adjacent end of the transverse bore 20. This recess has a sloping end wall 24a at the right hand end thereof. When the driving dog is in its retracted position, a portion of its inner wall at the right of the sloping end of recess 24 bears against the adjacent end of detent element 22 and keeps the latter back in the bore 20 flush with the end thereof as shown in Fig. 1. The extremity of the section 22 of the detent is provided with opposite bevelled or sloping surfaces 22a, each matching the end wall 24a in slope so that it is immaterial which is positioned for co-action with such end wall in the operation hereinafter described.

The detent end section 23 co-acting with the backing dog is provided with sloping or bevelled opposite surfaces 23a at its extremity. When the dogs are in retracted positions as shown in Fig. 1, detent end section 23 protrudes from bore 20 into a recess 25 in the inner wall of the backing dog 8 and is retained by compressed spring section 21 in such recess, thereby retaining the backing dog 8 retracted in guideway 6. The recess 25 has sloping end walls 25a matching the sloping surfaces 23a on the extremity of detent section 23 so that the projecting end of that section fits snugly in recess 25 of the backing dog.

The transverse bore 20 may be square or otherwise non-circular in cross-section and sections 22 and 23 of the floating detent of corresponding cross sectional configuration so as to prevent either from turning about its axis when in use. Bore 20 and elements 22 and 23 might be circular in cross-section and accidental rotary displacement of elements 22 and 23 prevented by any suitable known means (none shown) for that purpose. Bore 20 may be the bore of a hardened metal bushing 20a fitted in an appropriately larger opening formed in the metal of the shaft or may be formed directly in the material of the shaft itself.

The driving and backing jaws of the fly wheel hub may be provided in a plate 26 set into a recess 27 in the face of the fly wheel hub proper next to the enlarged portion 1b of the shaft and secured to the hub proper by countersunk cap screws 28, Fig. 4, or in any other suitable known manner. Plate 26 is provided with a plurality, 6 in the example shown, of regularly spaced radial slots 29 in the face thereof next to the portion 1b of the shaft. One side wall of each of these slots will serve as a driving jaw and the other as a backing jaw, this according to the direction of rotation of the fly wheel. With the fly wheel rotating clockwise as viewed in Fig. 4, the trailing side wall indicated at 30 of each slot 29 will be the driving jaw and the opposite or leading side wall, indicated at 31, will be its backing jaw. The fly wheel may be driven or turned about its axis by suitable power means, not shown, for the operation of the press. It may be turned by hand when the power is off, as in setting dies or making adjustments. The plate 26 may be of hardened steel or metal alloy so that jaws are wear-resistant. Obviously, the plate 26 and its jaws may be formed as an integral part of the fly wheel hub itself if the material thereof is suitable for the purpose or such jaws may be heat-treated steel pins or the like provided on the face of the fly wheel hub in any suitable known manner.

Assuming rotation of the fly wheel in a direction that is clockwise as viewed in Fig. 4 and counterclockwise as viewed from the right in each of Figs. 1, 2, 5, 6 and 7, a cycle of operations of the clutch mechanism as described so far may be substantially as follows. Withdrawal of the switch plate 14 from its restraining position as shown in Fig. 1 will permit the driving dog 7 to be projected by the action of its spring 10 so that it will protrude from the guideway 5 against hub plate 26. The projecting end of the dog 7 is bevelled at its front side at an angle of approximately 45° as indicated at 32 in Figs. 5, 6 and 8. Should the end of dog 7 first strike a portion of the plate 26 between two adjacent slots 29, the further rotation of the fly wheel hub will permit the end of the dog to enter the slot 29 first encountered, the bevelled surface 32 first engaging the leading edge of the slot and guiding the dog into the slot until its extremity hits the slot bottom. The driving jaw 30 will strike the rearward side face of the inserted end of the dog 7 which then will be in its fully engaged position as shown in Figs. 2 and 6. Further rotation of the fly wheel effects rotation of the shaft 1 which will be driven in unison with and at the same speed as the fly wheel.

The switch plate 14 may be withdrawn from its latching position as shown in Figs. 1 and 3 by any suitable known means, as by a switch plate retracting mechanism which includes a hook 33 and a cooperative projection 34, Fig. 3, on the switch plate, the switch plate moving in a guideway 35 in a switch plate housing 36. The switch plate, its mounting and retracting mechanism are not further shown or described since they may be conventional. In practice, the hook 33 may be shifted clear of the projection 34 after the switch plate has been withdrawn and the driving dog has been released and has been moved from its retracted to its projected position in engagement with a driving jaw on the fly wheel hub. This will leave the switch plate free to return under actuation by conventional spring means, not shown, until its further movement is stopped by contact with the bottom of the peripheral groove 15 on the enlarged portion 1b of the shaft.

As the driving dog 7 is moved from the position shown in Fig. 1 to the position shown in Figs. 2 and 6, the endwise pressure which it has exerted on the extremity of the section 22 of the floating detent 22—21—23 will be relieved somewhat when the extremity of detent element 22 is permitted to enter recess 24 in the inner side of the dog. The spring 21 is light or of less effective force than the spring 17 so that the latter then will be effective to force the backing dog 8 from its retracted position to its projected position as shown in Figs. 2 and 7. Detent element 23 will be forced completely into the bore 20. Since the engagement of dog 7 with a driving jaw of the fly wheel hub has already occurred, the backing dog will be in line with another slot 29 in the plate 26. The projecting end of the backing dog therefore will enter this slot so as to be in contact at its front or leading edge with backing jaw 31 of this slot as shown in Fig. 7. In that view, the backing dog 8 is shown as having a slight taper on its front side from its extremity rearward as indicated at 37 and the backing jaw 31 of the slot 29 has a corresponding taper 38 so that dog 8 will "wedge" itself into tight contact with the backing jaw side of the slot 29 even with normal manufacturing tolerances in the parts concerned. In the example shown, this has occurred when the extremity of the backing dog has been projected only part way into the slot. The extent of this projection may be different with different relative dimensions of the parts involved. The tapers may be dispensed with and allowance for normal manufacturing tolerances made so that the backing dog will always enter a slot and move to the bottom thereof. There then may be a slight clearance between the backing jaw and the adjacent side of the inserted end of the backing dog but, with normal manufacturing tolerances, this would not be of a magnitude to permit any objectionable backlash or lost motion.

With the clutch engaged and the shaft 1 turning as a unit with the fly wheel, a working stroke of the press may be effected. In the meanwhile, the working end of switch plate 14 is riding in the slot 15 around the axis of the rotating shaft. Backing dog 8 has a clearance slot cut in its outer surface as indicated at 39, Figs. 1 and 2, so that it cannot be engaged by the switch plate during this rotation of the shaft. The switch plate 14 is bevelled at one side as indicated at 40, Figs. 3 and 5, and the transverse slot 16 in the outer side of driving dog has its corresponding side wall bevelled as indicated at 41. Consequently, when the rotation of the shaft brings the driving dog 7 against the extremity of the tapered portion of the switch plate, the sliding contact of the inclined surface 41 against the bevelled surface 40 on the side of the switch plate will effect a camming action on the dog 7 and will force the latter back from its engaged position as shown in Figs. 2 and 6, to its retracted, disengaged position as shown in Figs. 1 and 5. The retraction of the driving dog 7 will be attended by an endwise camming of end element 22 of the floating detent between the two sliding dogs so as to compress the spring section 21 as the element 22 is forced back into bore 20. A brake, represented by a band indicated at 42, Fig. 1, may be tightened by conventional means, not shown, at the time the driving dog disengages its driving jaw of the rotating fly wheel so as to assure stoppage of rotation of the shaft quickly and positively.

The continued rotation of the fly wheel relative to the non-rotating shaft will cause the edge of the driving jaw 30 of the slot 29 into which the backing dog 8 projects to strike a bevelled surface 43, Fig. 7, on the adjacent side of the inserted portion of the backing dog 8. This bevelled surface may be at an angle of 45° to the longitudinal axis of the dog 8 and the engagement of the edge of the driving jaw 30 therewith will force the back ing dog out of the slot 29 to its retracted position, shown in Fig. 1. The latching end of the detent section 23 of the floating detent will be forced by its spring 21 into the recess 25 in the adjacent side of the retracted dog 8 and will retain the latter in its disengaged or retracted position. The clutch thus is fully disengaged.

It will be understood that the cycle of operations just described will be repeated for each of the successive strokes of a punch or other working tool of a press to which the invention has been applied.

For presetting operations, as in setting dies, it is desirable to back the shaft by a reverse manually effected rotation of the fly wheel, as in the direction indicated by the arrow in Fig. 8, before power has been applied to turn the fly wheel but after a driving connection has been established between the fly wheel and the shaft. In this operation, it is desirable to have some backlash in the system so that a "hammer blow" effect can be applied to the shaft by the impact of a driving jaw against the inserted end of the driving dog which has been released by a withdrawal of the switch plate and is in its projected position in a slot 29. The necessary backlash would be lacking if the release and projection of the driving dog had been followed by a similar movement of a backing dog as in the operation just described. The invention, therefore, provides additional means operable to retain the backing dog in its retracted, disengaged position after the driving dog has been released and is in its engaged position. In the particular embodiment of the invention shown, this means comprises a retaining screw 44 screwed into a threaded hole 45 in a portion of the shaft against a side of the retracted backing dog 3, as best seen in Fig. 3. The screw engaging hole 45 is at the bottom of a larger or counterbored opening 46 in the periphery of the shaft so that there is no projecting part to strike an adjacent part or cause damage. The screw 44 may be manipulated by use of a screwdriver or other suitable tool to lock in retracted position or to release the backing dog as required.

With the backing dog held in its retracted position and the driving dog in its engaged position, normal backlash or lost motion space will be provided by each of the slots 29. However, the reverse rotary movement of the fly wheel would be ineffective with a conventional driving dog to back the shaft since the leading edge of the backing jaw would drive against a 45° angle surface or bevel on the driving dog and cam the driving dog out of engagement with the fly wheel slot without establishing a backing connection with the shaft. To obviate this difficulty, the driving dog is provided with a notch 47 in the bevelled side of its inserted end portion at or near the outer end of such bevelled surface so as to provide a substantially square backing shoulder 47a in the path of the outer edge portion of the adjacent backing jaw 31. See Figs. 6 and 8 and note that when the fly wheel is being turned in a reverse direction as indicated by the direction arrow of Fig. 8, a portion of the backing jaw of the slot 29 involved will drive against the shoulder 47a of the driving dog and the press shaft thus may be backed or turned in a reverse direction by hand to any extent desired and for any useful purpose. The backing shoulder 47a does not, however, interfere with the movement of the driving jaw to engaged position in a slot 29 when the jaw moves from its retracted position as shown in Fig. 1 to its projected position as shown in Figs. 2, 6 and 8.

It thus will be apparent that the present invention maintains in a double sliding dog clutch arrangement the advantages flowing from the elimination of backlash or lost motion between the press flywheel and the press shaft when the press is in operation and also provides the further advantage that in setting dies or other presetting or adjusting operations before the power has been turned on desirable backlash or lost motion is provided and a reverse rotation or backing of the shaft may be effected by a manual operation of the flywheel.

While the invention has been described in detail as applied operatively to a construction which includes a driven member in the form of a portion of a press shaft and a driving member in the form of a flywheel, such invention obviously is susceptible of use in other structures to make and break a driving connection between a rotary driving member and a rotary member to be driven. Also, many changes in and modifications of the illustrative embodiment of the invention will be obvious to those skilled in the art and we, therefore, do not wish to be limited to the details of such embodiment as shown in the drawings and hereinbefore particularly described.

We claim:

1. A clutch mechanism comprising the combination with a rotary member to be driven and a rotary driving member coaxial with the first member and adjacent thereto, said rotary driving member having a driving jaw and a backing jaw thereon spaced angularly around and radially from the axis of said members, of a slidable driving dog mounted on the first rotary member for movement thereon relative to the rotary driving member between a retracted position clear of the latter and a projected position in engagement with the driving jaw, means operable to return the driving dog from its projected position to its retracted position and to retain it there until its release is desired, a slidable backing dog also mounted on said first rotary member for movement thereon relative to the rotary driving member between a retracted position clear of the latter and a projected position in engagement with said backing jaw, backing dog latching means actuated by said driving dog when the latter is in retracted position to retain the backing dog also retracted and automatically to release the backing dog for movement to projected position when the driving dog is projected, means urging said backing dog continuously from its retracted position to its projected position, and manually operable means to releasably retain said backing dog in retracted position despite release thereof by said first named backing dog retaining means because of movement of the driving dog to projected position.

2. A clutch mechanism as defined by claim 1 wherein said manually operable means comprises a locking screw in a threaded hole in the rotary driven member in position to be tightened against the backing dog when desired.

3. A clutch mechanism as defined by claim 1 wherein said driving dog is provided with a lateral backing shoulder on its projecting end portion in position to be struck and driven by a backing jaw on the rotary driving member to turn the first rotary member reversely when the driving dog is in projected position while the backing dog is retracted and the rotary driving member is being turned in the reverse direction.

4. A clutch mechanism for a power press or the like comprising a rotary shaft having a peripheral enlargement on a portion thereof, a fly wheel loose on the shaft adjacent to said peripheral enlargement and co-axial therewith, said fly wheel having a plurality of angularly spaced pairs of spaced driving and backing jaws, respectively, provided on its face adjacent to one end of the peripheral enlargement on the shaft, a driving dog slidably mounted on said peripheral enlargement for movement relative thereto between a retracted, disengaged position and a projected position in which the projecting end of the driving dog extends between a pair of driving and backing jaws on the fly wheel in driven contact with the driving jaw and some clearance between itself and the backing jaw when the fly wheel is being rotated in one direction about said axis of the shaft and fly wheel, a backing dog slidably mounted on the peripheral enlargement of the shaft in angularly spaced relation to the driving dog, said backing dog being movable relative to said peripheral enlargement between a retracted, disengaged position and a projected position in which the projecting end of the backing dog extends between a different pair of the driving and backing jaws on the fly wheel and co-acts with the adjacent backing jaw to prevent any appreciable backlash or lost motion between the fly wheel and the shaft when the latter is being driven by motion transmitted through the contacting driving jaw and projected driving dog on the fly wheel and shaft, respectively, spring means urging said dogs individually from their retracted, disengaged positions to their projected positions, means operable to return the driving dog from its projected position to its retracted position and to retain it there until its release is desired, backing dog locking means controlled by the driving dog to retain the backing dog retracted when the driving dog is retracted and automatically to release the backing dog for movement to its projected position when the driving dog moves from its retracted position, and manually operable additional locking means to retain the backing dog retracted despite movement of the driving dog from its retracted position.

5. A clutch mechanism as defined by claim 4 wherein said driving dog has a bevelled lateral surface on its projecting end portion for sliding contact with the edge of the backing jaw first encountered when the driving dog moves toward projected position to guide the driving dog to a fully projected position for contact with the adjacent driving jaw of the fly wheel and is provided at the outer limit of said bevelled lateral surface with a backing shoulder adapted for driven contact with the backing jaw when the fly wheel is turned reversely while the driving dog is in its projected position and the backing dog is retracted.

6. A clutch mechanism for a power press or the like comprising a rotary shaft having a peripheral enlargement on a portion thereof, a fly wheel loose on the shaft adjacent to said peripheral enlargement and co-axial therewith, said fly wheel having a plurality of angularly spaced pairs of spaced driving and backing jaws, respectively, provided on its face adjacent to one end of the peripheral enlargement on the shaft, a driving dog slidably mounted on said peripheral enlargement for movement relative thereto between a retracted, disengaged position and a projected position in which the projecting end of the driving dog extends between a pair of driving and backing jaws on the fly wheel in driven contact with the driving jaw and some clearance between itself and the backing jaw when the fly wheel is being rotated in one direction about said axis of the shaft and fly wheel, a backing dog slidably mounted on the peripheral enlargement of the shaft in angularly spaced relation to the driving dog, said backing dog being movable relative to said peripheral enlargement between a retracted, disengaged position and a projected position in which the projecting end of the backing dog extends between a different pair of the driving and backing jaws on the fly wheel and co-acts with the adjacent backing jaw to prevent any appreciable backlash or lost motion between the fly wheel and the shaft when the latter is being driven by motion transmitted through the contacting driving jaw and projected driving dog on the fly wheel and shaft, respectively, spring means urging said dogs individually from their retracted, disengaged positions to their projected positions, means operable to return the driving dog from its projected position to its retracted position and to retain it there until its release is desired, and releasable means to lock the backing dog in its retracted position, said driving dog having a bevelled lateral surface adjacent its extremity proximal to the fly wheel for sliding contact with the backing jaw first encountered when the driving dog is released and moves toward its projected position to guide the driving dog to its fully projected position for driven contact with the adjacent driving jaw, said driving dog further having a backing shoulder at the outer limit of the bevelled surface in position for driven contact with the backing jaw when the fly wheel is turned reversely while the driving dog is in projected position and the backing dog is retracted.

References Cited in the file of this patent

UNITED STATES PATENTS

| Number | Name | Date |
| --- | --- | --- |
| 843,453 | Hamann | Feb. 5, 1907 |
| 2,011,629 | Hannemann et al. | Aug. 20, 1935 |
| 2,016,806 | Schellenbach | Oct. 8, 1935 |
| 2,122,594 | Stewart | July 5, 1938 |
| 2,492,284 | Heim | Dec. 27, 1949 |
| 2,506,452 | Havir | May 2, 1950 |